Feb. 28, 1950   M. E. NIELSEN   2,499,154
SPRING APPLIED VACUUM RELEASED BRAKE
Filed Feb. 1, 1947
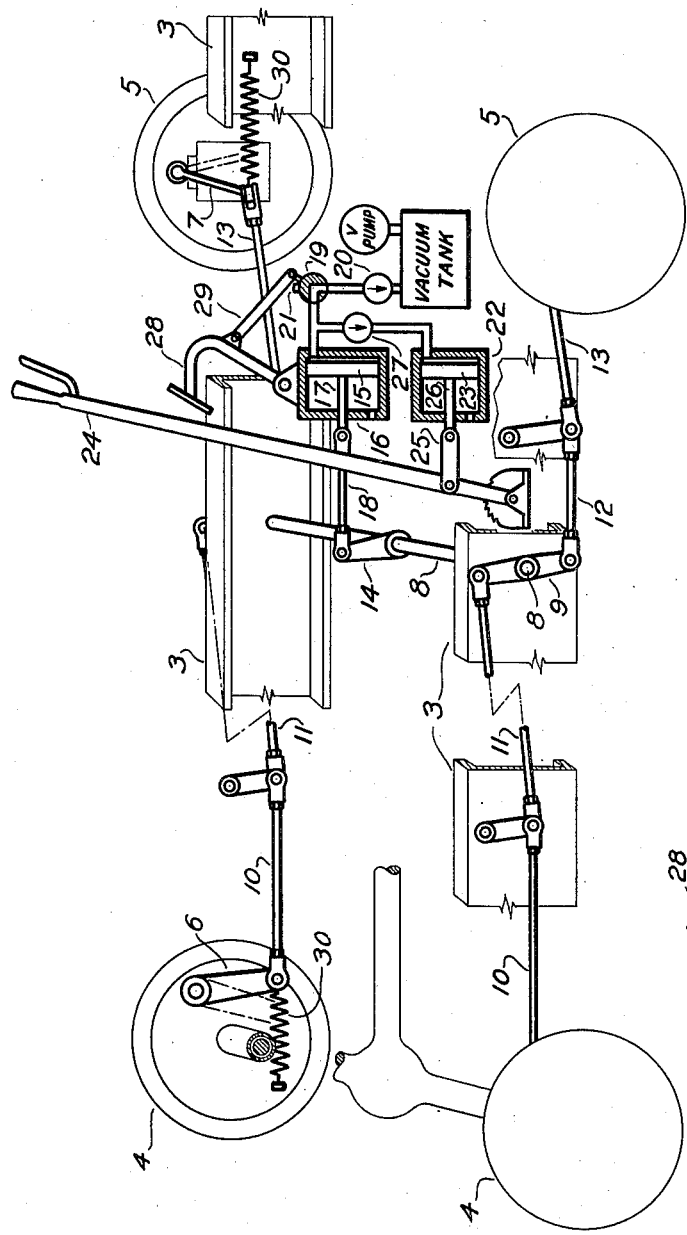
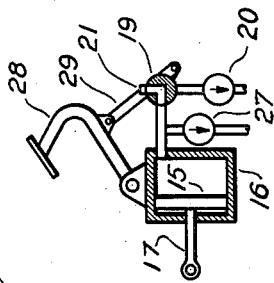
INVENTOR
Martin E. Nielsen
BY
Harry C. Schroeder
ATTORNEY Patented Feb. 28, 1950

2,499,154

UNITED STATES PATENT OFFICE 2,499,154

SPRING APPLIED VACUUM RELEASED BRAKE

Martin E. Nielsen, El Cerrito, Calif.

Application February 1, 1947, Serial No. 725,866

1 Claim. (Cl. 188—170)

This invention relates to brakes, and more particularly to brakes for automotive vehicles, the principal object being to provide a braking mechanism that will function automatically upon the removal of a restraining means as will be described herein.

A further object of the invention is the provision of a mechanism that will automatically maintain the brakes of a parked car in the applied position.

A still further object of the invention is the provision of means for manually releasing the automatic feature of the device.

I attain these objects by the mechanism illustrated in the accompanying drawing, in which—

Figure 1 is a schematic layout of a mechanical braking mechanism incorporating my improved features.

Figure 2 is a detail of the brake operating cylinder and valve in the brake applied position.

Referring to the drawing in detail, an automobile chassis is indicated fragmentarily at 3, with rear brake drums 4, and front brake drums 5. The brake drums 4, and 5, are equipped with the conventional internal expanding type of shoes operated by the levers 6, and 7, respectively. The levers 6, and 7, are connected in the usual manner to the cross shaft 8, by the double cranks 9, and by pull rods 10, and 11, and 12, and 13, respectively. Up to this point, the mechanism as described is symmetrical relative to the longitudinal center line of the vehicle.

The cross shaft 8, is operated by a crank 14, connected to the piston 15, of a vacuum cylinder 16, by means of the piston rod 17, and a link 18. The cylinder is connected to a vacuum tank through a three-way valve 19, and a check valve 20. It can also be connected to the atmosphere at port 21, on the valve 19. A further connection is made from the same end of the cylinder 16, to an emergency cylinder 22, the piston 23, of which is manually operated by means of the hand lever 24, and link 25, and piston rod 26. A check valve 27, is interposed between cylinders 16, and 22. A vacuum pump, which may be driven by the automobile engine, is provided for the purpose of maintaining a vacuum in the tank while the engine is running.

The brake pedal 28, operates the valve 19, by means of a link 29, and in its normal position, as shown in Figure 1, connects the cylinder 16, with the vacuum tank. In the depressed position, as shown on Figure 2, the valve 19, connects the cylinder 16, to the atmosphere through port 21.

In operation, a vacuum is maintained in the tank which causes the piston 15, to assume a position at the forward end of the cylinder 16, and thus hold the entire brake mechanism in the brake released position as shown on Figure 1. The brakes are applied by depressing the foot pedal 28, which operates the valve 19, closing the connection to the vacuum tank and allowing air to enter the cylinder 16, through the port 21. Balancing of the air pressure on each side of the piston 15, allows the tension springs 30, to actuate the levers 6, and 7, and thus apply the brakes. Figure 2, illustrates the position of the piston 15, and the valve 19, when the pedal 28, is depressed.

During normal running operation, the pull rods 10, and 11, and 12, and 13, are maintained in a state of tension by the atmospheric pressure acting on the back side of the piston 15, which pressure is sufficient to overcome the force exerted by the springs 30; however, when the pressure is opposed by admission of air to the front side of the piston 15, the springs 30, urge the levers 6, and 7, to assume the brake applied position as shown in phantom on Figure 1.

When the car is brought to a standstill, and the engine stopped, the vacuum tank is no longer able to maintain the piston 15, in the forward position, and the brakes are applied by the tension exerted by springs 30. In order to release the brakes when the vacuum tank is inoperative, the emergency cylinder 22, is utilized by operation of the hand lever 24. This draws the air from the forward end of the cylinder 16, and serves to hold the brakes in the released position until the engine is started and the vacuum pump once more begins to function.

Valve 20, prevents any ingress of air to the cylinder 16, from the vacuum tank, when the emergency cylinder is being used, and valve 27, forms a similar function by sealing the cylinder 16, against any leakage through cylinder 22, during normal running operation.

From the foregoing it will be apparent that I have devised a braking system that provides safety features not found on the conventional type of brake. If any part of the mechanism fails, as for instance the breaking of a pull rod or a shackle connection becoming detached, the brakes will automatically be applied and the vehicle brought to a stop. It will also be apparent that as the tank is unable to maintain a vacuum when the pump is inoperative, the brakes will always be automatically applied when the engine is stopped and the car is parked.

While I have disclosed a preferred embodiment of my invention, it will be understood that modifications may be made within the spirit and scope of the appended claim.

I claim:

In combination with plurality of brakes each having a brake drum and a pair of brake shoes being normally set on the drum, with a brake operating mechanism comprising a vacuum brake cylinder having a piston adapted to slide therein; a vacuum tank connected with said cylinder and adapted to operate said piston; means connecting said piston with the brake shoes; a valve between said cylinder and said vacuum tank adapted to connect said cylinder with the vacuum tank or with the atmosphere; said piston being adapted to actuate said brake shoes to release the brakes when said cylinder is connected with the vacuum tank; an emergency cylinder connected with the first cylinder; and means for creating vacuum in the emergency cylinder.

MARTIN E. NIELSEN.

REFERENCES CITED

The following references are of record in the file of this patent:

UNITED STATES PATENTS

| Number | Name | Date |
|---|---|---|
| 548,474 | Snell | Oct. 22, 1895 |
| 1,605,747 | Magness | Nov. 2, 1926 |
| 2,318,798 | Piron | May 11, 1943 |